United States Patent
Hasui

(12) 
(10) Patent No.: US 6,887,808 B2
(45) Date of Patent: May 3, 2005

(54) INFRARED BROADBAND DICHROIC GLASS POLARIZER

(75) Inventor: Kenjiro Hasui, Osaka (JP)

(73) Assignee: Corning Incorporated, Corning, NY (US)

(*) Notice: Subject to any disclaimer, the term of this patent is extended or adjusted under 35 U.S.C. 154(b) by 126 days.

(21) Appl. No.: 10/679,082

(22) Filed: Oct. 3, 2003

(65) Prior Publication Data

US 2004/0067834 A1 Apr. 8, 2004

Related U.S. Application Data

(62) Division of application No. 09/736,813, filed on Dec. 14, 2000, now Pat. No. 6,761,045.
(60) Provisional application No. 60/170,978, filed on Dec. 15, 1999.

(51) Int. Cl.[7] ............................ C03C 4/00; C03C 14/00; C03C 3/091
(52) U.S. Cl. .............................. 501/13; 501/32; 501/56; 501/66; 501/77
(58) Field of Search ............................ 501/13, 32, 56, 501/66, 77

(56) References Cited

U.S. PATENT DOCUMENTS

| | | | |
|---|---|---|---|
| 4,479,819 A | 10/1984 | Borrelli et al. | 65/30.11 |
| 4,908,054 A | 3/1990 | Jones et al. | 65/30.11 |
| 5,122,907 A | 6/1992 | Slocum | 359/797 |
| 5,840,096 A | 11/1998 | Tajima et al. | 65/30.1 |
| 6,221,480 B1 | 4/2001 | Borrelli et al. | 428/325 |
| 2002/0053221 A1 | 5/2002 | Grossman et al. | 65/32.1 |

FOREIGN PATENT DOCUMENTS

| | | |
|---|---|---|
| JP | 5-208844 | 8/1993 |
| WO | WO98/24624 | 6/1998 |

*Primary Examiner*—Karl Group
*Assistant Examiner*—Elizabeth A. Bolden
(74) *Attorney, Agent, or Firm*—Siwen Chen; Thomas R. Beall

(57) ABSTRACT

Polarized glass articles having a wavelength range that is broadened for high contrast-ratio applications. A method that imparts to a glass article a high contrast ratio of at least 40 dB for use as dichroic glass polarizers over a wavelength range of 880 nm to 1,690 nm while keeping a high transmission value. The method comprises the step of heating the glass article at a temperature ranging from 400 to 450° C. in a reducing atmosphere for a period of time ranging from 12 to 30 hours. Preferably, the reducing atmosphere is hydrogen at atmospheric pressure.

8 Claims, 4 Drawing Sheets

INFRARED BROADBAND DICHROIC GLASS POLARIZER

This application is a divisional of application Ser. No. 09/736,813 filed Dec. 14, 2000, now U.S. Pat. No. 6,761,045, which claims benefit of Provisional Application No. 60/170,978 filed Dec. 15, 1999.

TECHNICAL FIELD

This invention relates to infrared broadband contrast ratio dichroic glass polarizers.

BACKGROUND ART

Fabrication of the dichroic glass polarizer is known to the art. One of the key processes is heating the elongated metal-halide particles precipitated glass in a reducing atmosphere. The reduction rate varies as the square root of the pressure. Also, the reduction proceeds with a dependence on the square root of time.

One of the important features of a polarizing body is the bandwidth over which the body is effective. This property takes into consideration not only the degree of contrast ratio, but the portion of the spectrum within which the contrast is sufficiently high to be useful. A contrast ratio of 40 dB has been taken as a point of reference for comparison purposes. The lower the reference contrast ratio, the broader the corresponding bandwidth. I have chosen 40 dB contrast ratio because it represents a common high performance value specified for polarizer applications.

The peak contrast ratio wavelength for dichroic glass polarizers is determined by the aspect ratio of the elongated particle. The aspect ratio increases with the degree of stress applied to stretch the glass, and thereby the crystals. The wavelength at which peak contrast ratio occurs increases with the aspect ratio. The precipitated halide particles developed by heat treatment in air atmosphere have a certain size distribution in glass matrix. The aspect ratio of subsequently elongated particles, therefore, has a certain distribution. Thus, the chemically reduced metallic particles have a certain distribution of the aspect ratios. The application wavelength, which is bandwidth, is determined by the combination of the distribution of the peak contrast ratio wavelength by one metallic particle and aspect ratio distribution of metallic particles. Thus, the bandwidth is determined by the summation of the aspect ratios of the metallic particle shapes. The shape of a contrast ratio versus wavelength curve for a polarizing glass is therefore the superposition of the peaks for all the particles. The so-called Center Wavelength (CW) is the application wavelength range in which peak contrast ratio wavelength is optimized with stretching stress and size distribution of silver halide particles. For example, the elongation stress and particles size for a polarizer effective at 1,500 nm are quite different from one effective at 600 nm. In order to broaden the bandwidth, distribution of aspect ratio needs to be broadened. Most applications in the near infra-red (NIR) require an applicable wavelength range of 1,300–1,500 nm. However, other application requires contrast ratio peaks outside this range. For example, peaks as low as 980 nm are used for pump laser application in amplification.

Heretofore, it has been necessary to produce polarizing glass articles on an individual basis. Thus, it was necessary to design a separate set of processing conditions tailored to provide the peak contrast ratio for each application wavelength. Then care had to be taken to control the process quite rigidly.

The maximum bandwidth available heretofore with a commercially practical figure was no more than 200 nm. Broader bandwidth from visible to NIR wavelengths region for dichroic glass polarizers are found in U.S. Pat. No. 4,908,054. In the patent, a contrast ratio greater than 40 dB, is obtained from 610 nm to a 1,060 nm, indicating the bandwidth to be approximately 450 nm. This patent teaches that pressurized hydrogen atmosphere is effective for broadening the waveband. Japanese Patent Office, Kokai Patent Application No. HEI 5 [1993]-208444 describes a contrast ratio greater than 50 dB with the insertion loss less than 0.1 dB is obtained at 1,310 and 1,550 nm and describing wider bandwidth than 200 nm in NIR wavelength region. Glass polarizer with broadband contrast ratio is found in a provisional patent application, Serial No. 60/027,254, filed Sep. 30, 1996, where a heat treatment process for generating silver halide particles is changed in order to impart wider size distribution of the halide particles. This wider distribution of the halide particles results in wider distribution of elongated halide particle, after the stretching step. The wider distribution of the elongated halide particle results in wider distribution of the metallic particles, after the reduction process. Even though this patent does not describe quantitative results on broadened waveband, contrast ratio greater than 40 dB was obtained from about 1,080 nm to about 1,520 nm, indicting bandwidth to be approximately 440 nm. Further, wider bandwidth is found in the provisional patent application, Serial No. (P00210), filed Dec. 4, 1996, where bandwidth, at a contrast ratio greater than 50 dB, is enlarged to 700–900 nm by the reduction under extremely high hydrogen pressure, 100 atmospheres, at a temperature below 400° C. Broadest bandwidth in NIR region in this patent application is 900 nm bandwidth, where the contrast ratio greater than 50 dB is obtained from 600 nm to 1,500 nm. This best result is obtained with two steps reduction process for a CW of about 1,480 nm product, in which the first process is heat treatment in a hydrogen with one atmosphere at 420° C. for 4 hours and the second process is with 100 atmospheres at 350° C. Employment of the extremely high hydrogen pressure would not be a practical process. The purpose of my invention is to broaden the application bandwidth of dichroic glass polarizer with easy practical process.

DISCLOSURE OF INVENTION

The present invention provides polarized glass articles that have a broadened high contrast ratio in their applicable wavelength range, including wavelengths ranging from 880 nm to 1,690 nm. Practice of the present invention contemplates employing all of the steps in the conventional manner, except for the final reduction step. The present invention is concerned with the final step in which reduction of the metal halide to metal takes place. In a broad sense, it is proposed to carry out the reduction step at temperature above at least 405° C. for longer duration or at higher pressure to make a deeper reduced layer. The process of producing the polarizing glass article includes the final step of heating the glass article at a temperature ranging from 400 to 450° C. in a reducing atmosphere by products of time multiplied by pressure greater than 12, where the units for time and pressure are hour and atmosphere, respectively. More preferably, the temperature ranges from 405 to 450° C. and the products of time multiplied by pressure is greater than 24.

In the present invention, broadening the range is accomplished by expanding the band from an original bandwidth to only a shorter wavelength region. Thus, the employed glass article should be stretched at high stress. In other words, the CW of the employed sample should be longer than 1,550 nm. It is desirable that the CW (or application wavelength) of the potential products using the present invention be longer, since the broadening only took place for shorter wavelength region.

The polarizing glass article comprising a base glass and precipitated silver particles wherein the polarizing glass article exhibits a contrast ratio of at least 40 dB over a wavelength range of 880 nm to 1,690 nm, and, thus a bandwidth of 810 nm. This means that the contrast ratio is consistent over the entire bandwidth at the range of wavelength specified.

The polarizing glass article comprising a base glass and precipitated silver particles wherein the polarizing glass article exhibits a contrast ratio of at least 50 dB over a wavelength range of 980 nm to 1,640 nm, and, thus a bandwidth of 660 nm. This means that the contrast ratio is consistent over the entire bandwidth at the range of wavelength specified.

The significance of the present inventive dichroic glass polarizer for telecommunication applications is that it replaces commercially available linear polarizers, such as birefringent crystal polarizers, other glass polarizers, and/or Polarizing Beam Splitters (PBS).

The process of producing the polarizing glass article includes the final step of heating the glass article at a temperature ranging from 400 to 450° C. in a reducing atmosphere for a period of time ranging from 12 to 30 hours. Preferably, the temperature ranges from 405 to 450° C. and the time ranges from 12 to 24 hours. More preferably, the temperature ranges from 405 to 420° C. and the time ranges from 16 to 24 hours. The bandwidth from 880 to 1,690 nm, where contrast ratio is greater than 40 dB, is obtained at atmospheric hydrogen pressure for 24 hours at 420° C. We however can manipulate both time and pressure. In other words, we can use the reduction process at 4 atmospheres and 6 hours instead of 1 atmosphere for 24 hours.

BEST MODE OF CARRYING OUT INVENTION

Figure 1:
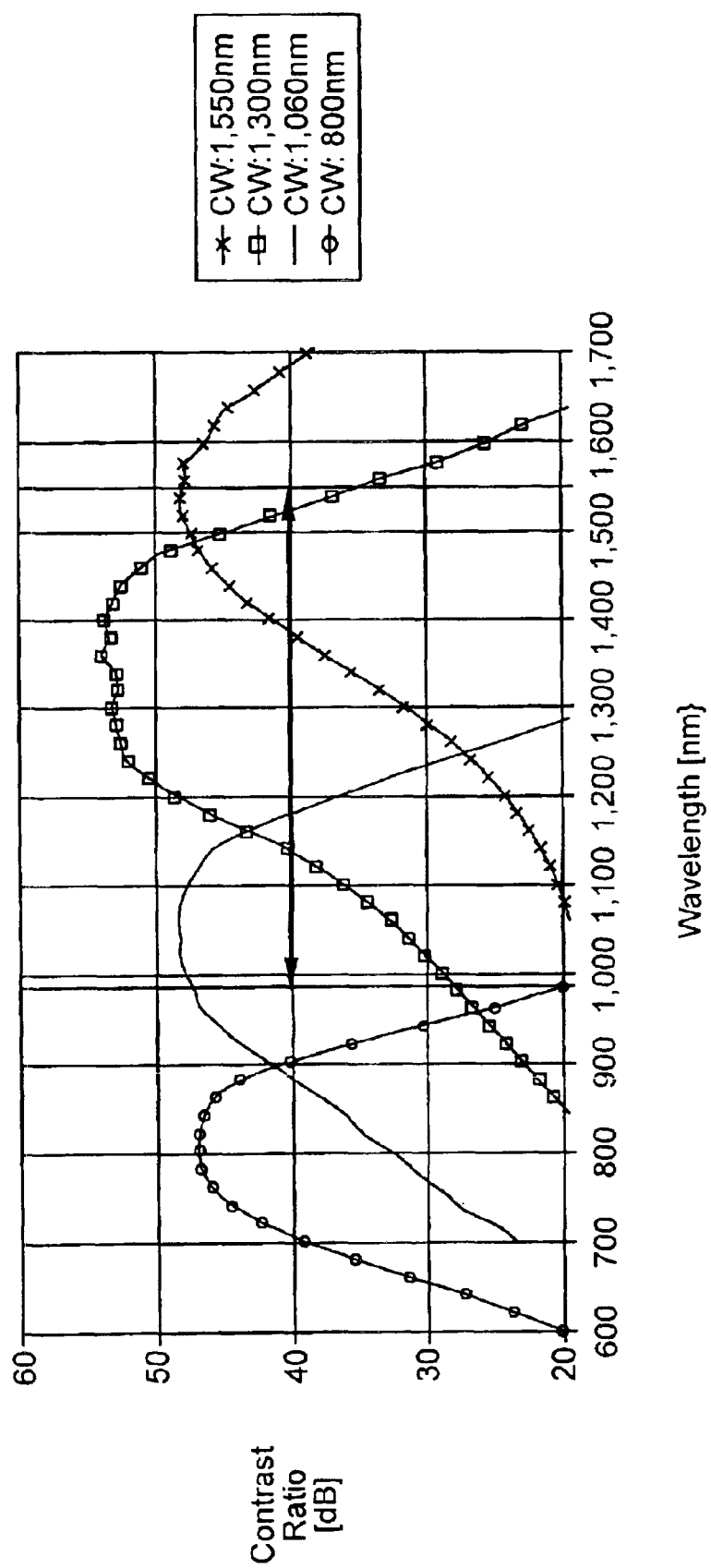
FIG. 1 plots contrast ratio versus wavelength for a commercial dichroic glass article.

Japanese Patent Application No. 208444 describes a contrast ratio>50 dB at the both 1,310 and 1,550 nm wavelengths (bandwidth 240 nm). The present invention demonstrates that a contrast ratio greater than 50 dB was obtained from 980 nm to 1,640 nm (660 nm bandwidth). Thus, the applicable wavelength range is much wider. Also, contrast ratio greater than 40 dB was obtained from 880 nm to 1,690 nm, indicating the bandwidth to be 810 nm. As a result, the broadband contrast ratio dichroic glass polarizers is in near infrared (NIR) wavelength region. This broadening application wavelength is made only with the change in reduction process.

As mentioned earlier, other attempts to broaden bandwidth are known. Those patents adopt and improve on the known method of producing a polarizing glass body. These processes changed early in entire process. Optimization such as elongation and hydrogen reduction still would be needed. One process changed the hydrogen reduction process. However, this process is not practical because of the employment of extremely high hydrogen pressure, up to 100 atmospheres. Facilities for high hydrogen pressure are dangerous and generally not available. My process only changes the hydrogen reduction process. However, the process does not require high hydrogen pressure and is capable of broadening with currently available facilities.

Copper or copper-cadmium containing photochromic glasses are well known in the art, having been first described by Armistead et al. in U.S. Pat. No. 3,208,860 and thereafter finding commercial use principally in the manufacture of photochromic ophthalmic lenses. Such lenses darken upon exposure to actinic radiation, e.g. ultraviolet light, and fade in the absence thereof.

Second generation silver halide-containing photochromic glasses exhibiting improved darkening and fading characteristics have also been recently introduced. One family of such glasses has been described by G. B. Hares et al., U.S. Pat. No. 4,190,451.

Photochromic glasses which are preferred for use in the production of surface-colored photochromic glass articles in accordance with the invention are those set forth in the aforementioned Hares et al. Such glasses consist essentially, in weight percent, of about 0–2.5% $Li_2O$, 0–9% $Na_2O$, 0–17% $K_2O$, 0–6% $Cs_2O$, 8–20% $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.25% Cl, and 0.1–0.2% Br, wherein the molar ratio of alkali metal oxides: $B_2O_3$ ranges between about 0.55–0.85 and the weight ratio Ag:(Cl+Br) ranges between about 0.65–0.95. As also noted in the Hares et al. disclosure, such glasses may additionally contain, as optional constituents, up to about 10% total of other selected oxides or elements for known purposes, including up to about 6% $ZrO_2$, up to about 3% $TiO_2$, up to about 0.5% PbO, up to about 7% BaO, up to about 4% CaO, up to about 3 MgO, up to about 6% $Nb_2O_5$, up to about 4% $La_2O_3$, and up to about 2% F.

Of course, other photochromic glasses have been found suitable for use in the invention in varying degrees. Such glasses include copper or copper-cadmium containing glasses set forth in the aforementioned Armistead et al.

Reducing gases which may be used to induce surface coloration in photochromic glasses according to the invention include any of the reducing materials employed for the same or similar purposes in the prior art. Specific examples are hydrogen ($H_2$), forming gas (e.g. 95% $N_2$+5% $H_2$ by volume), carbon monoxide and cracked ammonia.

Dichroism of the prior art glass polarizer is due to anisotropy in plasma resonant absorption by free electron of the precipitated prolate ellipsoid silver particles. FIG. 1 above shows the contrast ratios of the currently available products. In order to broaden the application wavelength range, I needed to have large distributions of aspect ratio and particle size. It may be possible to enlarge the distribution by changing the nucleation heating condition or chemical composition of base glass. My process, herein, requires only changes in the current hydrogen firing process in terms of temperature, duration and pressure. This is significantly simpler, hence a more cost effective and efficient process.

According to certain embodiments, the present invention has a high transmittance value of, preferably, above about 90 percent at the wavelenghths ranging from about 880 nm to about 1,690 nm, or more preferably from 980 nm to 1,640 nm. The following examples illustrate the present invention.

EXAMPLE

Figure 2:
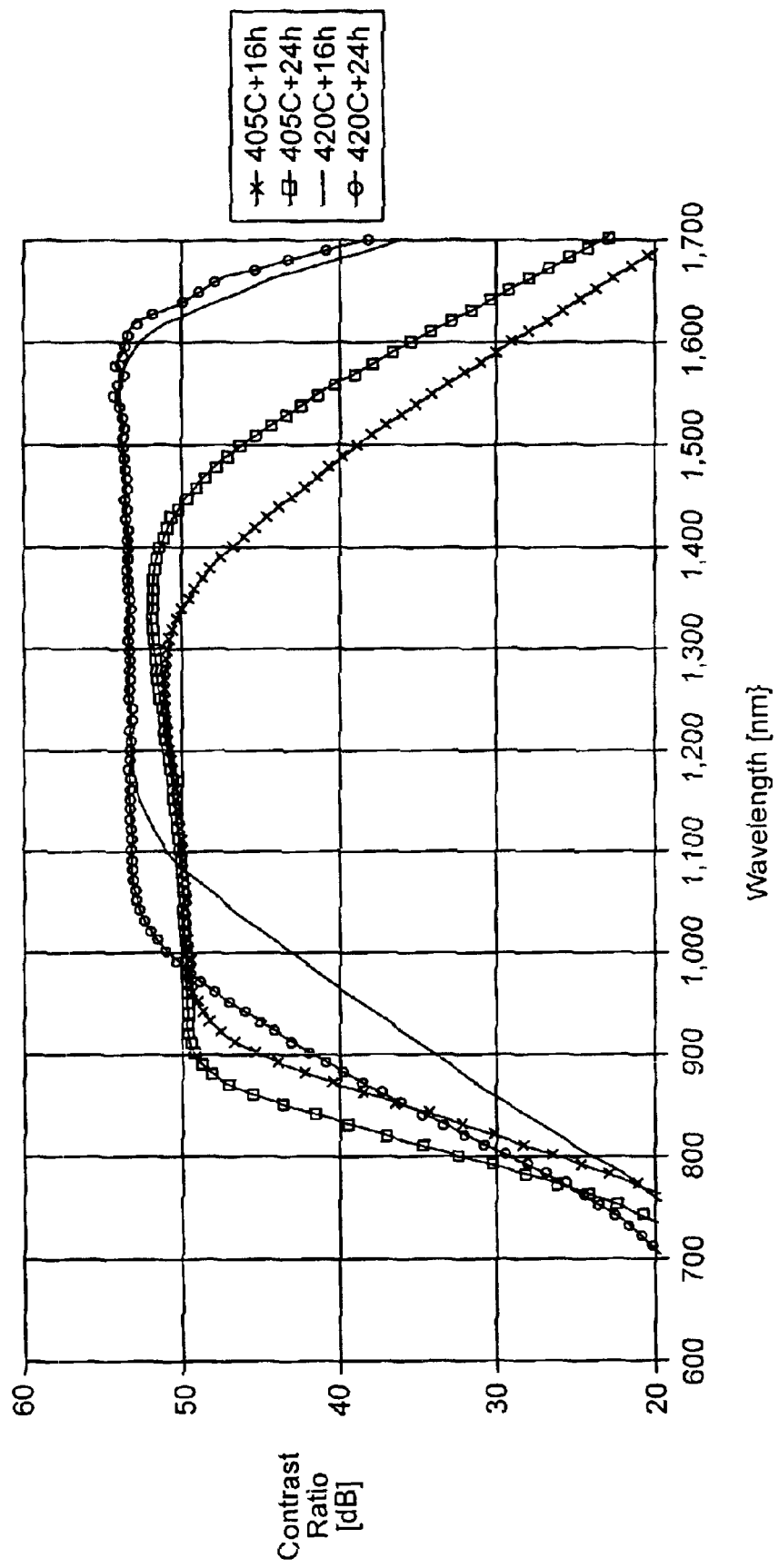
FIG. 2 plots contrast ratio versus wavelength for the dichroic glass article of this invention.

I conducted four sets of experiments using 0.2 mm thickness standard glass with 1,550 nm in CW. Conditions were 405 and 420° C. and 16 and 24 hours. Two samples were used in each condition. The hydrogen was undiluted hydrogen with about 195 sccm flow rate. After the reduction treatment, contrast ratio and transmittance was measured with a specially designed spectrophotometer. The measured condition was from 600 nm to 1,700 nm in 10 nm sampling step. FIG. 2 shows the contrast ratio of the inventive samples.

As can be seen from the figures, the applicable bandwidth of the sample reduced at 405° C. is located in shorter wavelength region, where there is small contrast ratio at the original CW, 1,550 nm. This is because of the partial reduction of silver particle. On the other hand, the bandwidth of the sample reduced at 420° C., in which silver particle should be completely reduced, still has high contrast ratio at original CW. In addition, the applicable wavelength range is extended to only shorter wavelength region. Also, longer reduction duration is effective for the broadening. This phenomenon suggests a slight change in aspect ratio distribution in thickness direction. In other words, the aspect ratio of the silver particle interior portion is smaller than that at the outer surface portion. Hence, it obtains a large distribution of aspect ratio without the partial reduction of silver particle.

The important discovery in the present invention is to reduce the silver halide particle layer deeper and deeper at the temperature, where silver halide is completely reduced. The reduced layer at the outer surface contributes to a high contrast ratio at original CW, in this case 1,550 nm; whereas, the reduced layer in the deeper portion contributes to a high contrast ratio at a shorter wavelength region than the CW. There is possibility that the aspect ratio distribution at the outer surface is equivalent to that at the interior. Since reduced particles number is larger for deeper reduction, however, the number of the reduced smaller aspect ratio particles will be larger, resulting in possibly a higher contrast ratio at shorter wavelength (broadening to shorter wavelength).

Figure 3:
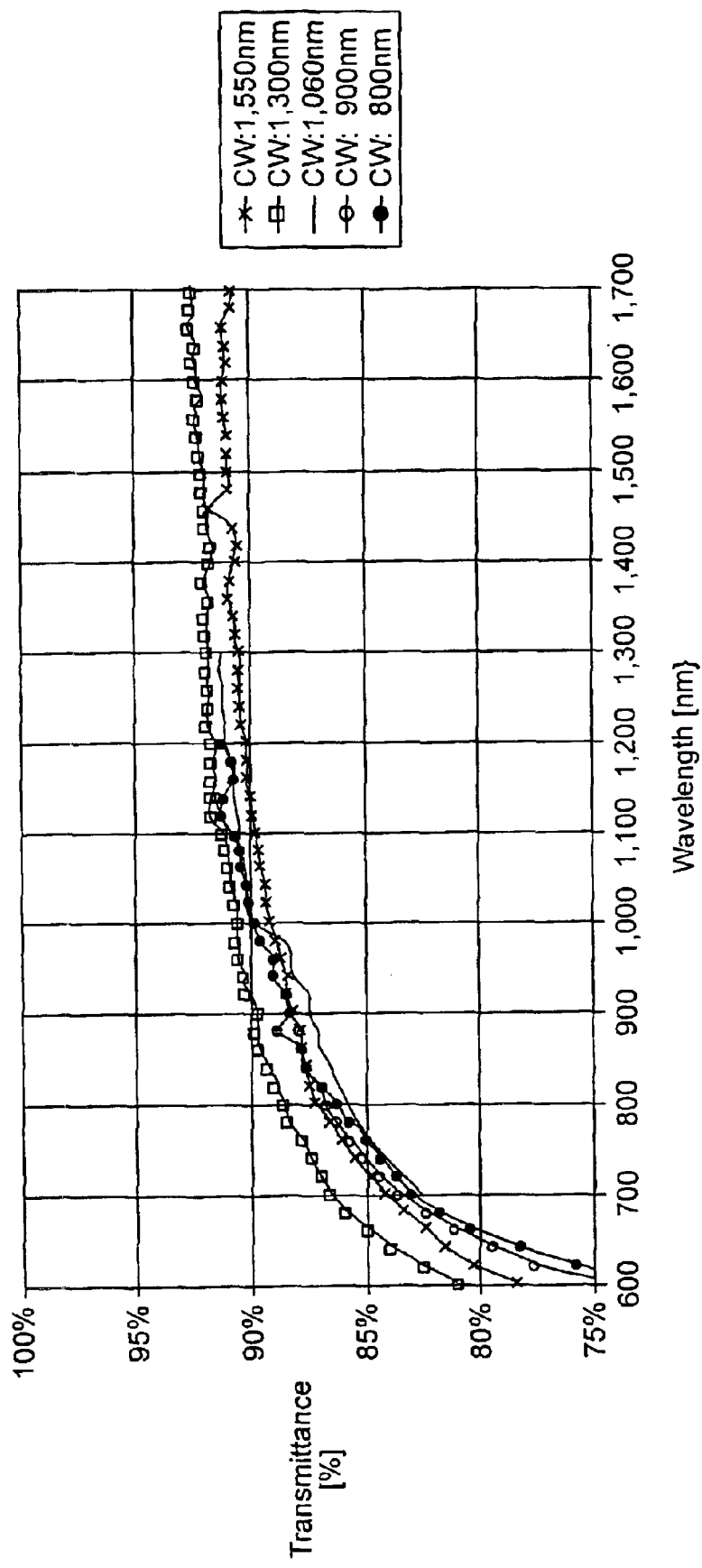
FIG. 3 plots transmittance versus wavelength for a commercial dichroic glass article.
Figure 4:
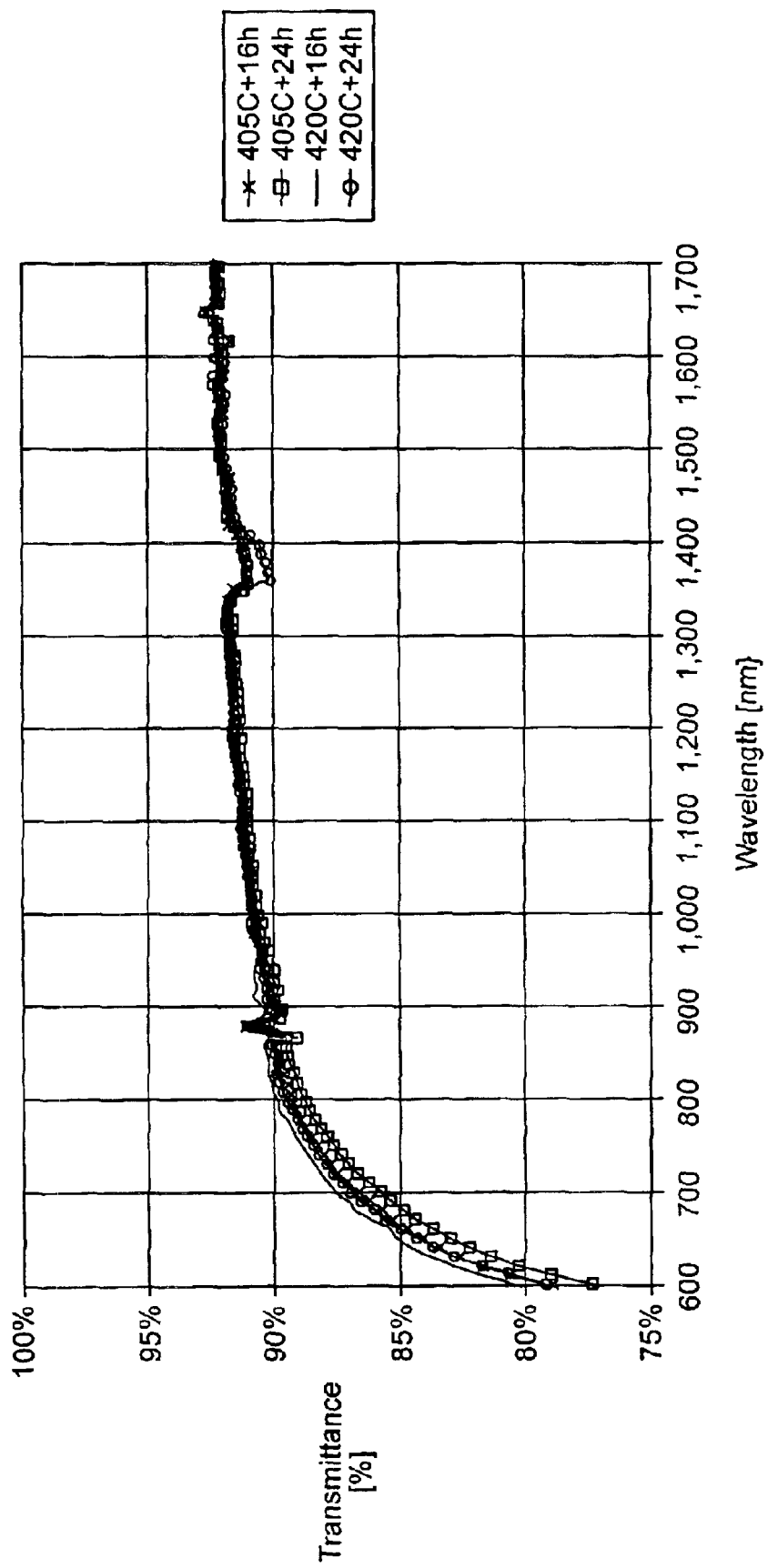
FIG. 4 plots transmittance versus wavelength for the dichroic glass article of this invention.

FIGS. 3 and 4 show transmittance of standard glass products and the inventive samples used above. Variation in transmittance was less than 0.6% for all cases. FIG. 4 indicates that transmittance was compatible to that of the standard in FIG. 3. The results indicate that no significant difference in transmittance between standard products and the inventive samples. Therefore, the inventive process does not degrade transmittance.

The method broadens the resonant absorption waveband with appropriate control in reduction condition which are temperature, duration and pressure. The raw data for FIGS. 2 and 4 appears in Table 1.

TABLE 1

Measurement Results of the Broadened Samples

| Hydrogen Firing | | Contrast Ratio | |
| --- | --- | --- | --- |
| Temp (° C.) | Time (Hrs.) | 1.31 µm CR[dB] | 1.55 µm CR[dB] |
| 405 | 16 | 50.8 | 33.7 |
| 405 | 16 | 50.8 | 34.3 |
| 405 | 24 | 51.9 | 41.0 |
| 420 | 16 | 51.6 | 41.5 |
| 420 | 16 | 53.2 | 53.5 |
| 420 | 16 | 53.6 | 54.0 |
| 420 | 24 | 53.1 | 53.5 |
| 420 | 24 | 53.6 | 54.9 |

| Hydrogen Firing | | λ (wavelength), CR > 40 dB | |
| --- | --- | --- | --- |
| Temp (° C.) | Time (Hrs.) | Start | End |
| 405 | 16 | 870 | 1480 |
| 405 | 16 | 870 | 1480 |
| 405 | 24 | 840 | 1550 |
| 420 | 16 | 840 | 1560 |
| 420 | 16 | 960 | 1700 |
| 420 | 16 | 980 | 1700 |
| 420 | 24 | 870 | 1660 |
| 420 | 24 | 900 | 1700 |

As a result, the reduction proceeds with a dependence on the square root of time and pressure. Therefore, shorter reduction cycle is applicable, when higher pressure is employed. For example, the employed reduction process of 24 hours at atmospheric pressure corresponds to 8 hours at 3 atmospheres.

Although the now preferred embodiments of the invention have been set forth, it will be apparent to those skilled in the art that various changes and modifications may be made thereto without departing from the spirit and scope of the invention as set forth in the following claims.

I claim:

1. A polarizing glass article comprising a base photochromic glass selected from either a copper or copper-cadmium family, or a silver halide-containing glass family having precipitated silver particles wherein the polarizing glass article exhibits a contrast ratio of at least 40 dB over a wavelength range of 880 nm to 1,690 nm and a bandwidth of 810 nm.

2. The glass article according to claim 1, wherein the transmittance value is above 90 percent at the wavelength ranging from 880 nm to 1,690 nm.

3. A polarizing glass article comprising a base glass selected from either a copper or copper-cadmium family, or a silver halide-containing glass family having precipitated silver particles wherein the polarizing glass article exhibits a contrast ratio of at least 50 dB over a wavelength range of 980 nm to 1,640 nm and a bandwidth of 660 nm.

4. The glass article according to claim 3, wherein the transmittance value is above 90 percent at the wavelength ranging from 980 nm to 1,640 nm.

5. The glass article according to claim 4, wherein the glass article has a center wavelength of at least 1,550 nm or longer.

6. The glass article according to claim 1, wherein the base glass has a composition consisting essentially, in weight percent, of about 0–2.5% $Li_2O$, 0–9% $Na_2O$, 0–17% $K_2O$, 0–6% $Cs_2O$, 8–20% total of $Li_2O+Na_2O+K_2O+Cs_2O$, 14–23% $B_2O_3$, 5–25% $Al_2O_3$, 0–25% $P_2O_5$, 20–65% $SiO_2$, 0.004–0.02% CuO, 0.15–0.3% Ag, 0.1–0.2% Br, and 0.1–0.25% Cl.

7. The glass article according to claim 6, wherein said glass includes as optional constituents, up to about 10% total of other oxides or elements selected in amounts not exceeding the indicated proportions from the group consisting of up to 6% $ZrO_2$, up to 3% $TiO_2$, up to 0.5% PbO, up to 7% BaO, up to 4% CaO, up to 3% MgO, up to 6% $Nb_2O_5$, up to 4% $La_2O_3$ and up to 2%F.

8. The glass article according to claim 6, wherein a molar ratio of alkali metal oxides: $B_2O_3$ ranges between about 0.55–0.85, and a weight ratio of Ag: (Cl+Br) ranges between about 0.65–0.95.

* * * * *